United States Patent
Fertig et al.

(10) Patent No.: US 12,548,963 B2
(45) Date of Patent: Feb. 10, 2026

(54) SYSTEMS AND METHODS FOR REDUCTION OF OPTICAL SIGNAL LINEWIDTH

(71) Applicant: Honeywell International Inc., Charlotte, NC (US)

(72) Inventors: Chad Fertig, Bloomington, MN (US); Chad Hoyt, Roseville, MN (US); Glen A. Sanders, Scottsdale, AZ (US); Jianfeng Wu, Tucson, AZ (US); Mary Salit, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 1245 days.

(21) Appl. No.: 17/376,894

(22) Filed: Jul. 15, 2021

(65) Prior Publication Data

US 2024/0322517 A1 Sep. 26, 2024

Related U.S. Application Data

(60) Provisional application No. 63/080,162, filed on Sep. 18, 2020.

(51) Int. Cl.
*H01S 3/067* (2006.01)
*H01S 3/08* (2023.01)

(52) U.S. Cl.
CPC ........ *H01S 3/0675* (2013.01); *H01S 3/08013* (2013.01); *H01S 3/08059* (2013.01)

(58) Field of Classification Search
CPC ... H01S 3/0675; H01S 3/08059–08068; H01S 5/0287–0288
See application file for complete search history.

(56) References Cited

U.S. PATENT DOCUMENTS 3,675,153 A * 7/1972 Bakeman ............ H01S 3/08059
372/100
4,615,033 A * 9/1986 Nakano ................... H01S 3/034
372/99

(Continued)

FOREIGN PATENT DOCUMENTS

CN 109149331 A * 1/2019 ........... H01S 3/0401
DE 102008049367 B3 * 10/2009 ............... G02B 5/08

(Continued)

OTHER PUBLICATIONS

European Patent Office, "Extended European Search Report from EP Application NO. 21186531.6", from Foreign Counterpart to U.S. Appl. No. 17/376,894, filed Feb. 14, 2022, pp. 1 through 9, Published: EP.

(Continued)

*Primary Examiner* — Joshua King
(74) *Attorney, Agent, or Firm* — Fogg & Powers LLC (57) ABSTRACT

In some embodiments, a system includes a laser that generates an optical signal and a resonator that receives the optical signal. The resonator includes an optical resonator cavity comprising a first and second end, wherein the optical signal propagates at a resonant frequency; a first optical anti-resonator terminating the first end and having a first stopband; and a second optical anti-resonator terminating the second end and having a second stopband. The system includes a detector that generates an electrical signal from a modified resonator output of the resonator; and Pound-Drever-Hall servo circuitry configured to generate control signals for controlling a frequency of the optical signal generated by the laser or phase modulation devices attached to the optical resonator cavity or the first or second optical anti-resonator, wherein each phase modulation changes a (Continued)

length of at least one of the optical resonator cavity or the first or second optical anti-resonator.

17 Claims, 3 Drawing Sheets

(56) References Cited

U.S. PATENT DOCUMENTS

| | | | | |
|---|---|---|---|---|
| 5,119,383 | A * | 6/1992 | Duling, III | H01S 3/1112 372/18 |
| 5,218,610 | A * | 6/1993 | Dixon | H01S 3/082 372/99 |
| 5,274,661 | A * | 12/1993 | von Gunten | G02B 5/0833 372/98 |
| 5,835,522 | A * | 11/1998 | King | H01S 5/065 372/18 |
| 6,393,040 | B1 * | 5/2002 | Govorkov | H01S 3/225 372/98 |
| 6,421,365 | B1 * | 7/2002 | Kleinschmidt | H01S 3/08068 372/98 |
| 6,647,046 | B1 * | 11/2003 | Salvatore | H01S 5/028 372/98 |
| 8,000,372 | B1 * | 8/2011 | Austin | H01S 3/1066 372/99 |
| 8,854,728 | B1 | 10/2014 | Brooks et al. | |
| 8,929,408 | B1 * | 1/2015 | Diels | H01S 3/1062 372/18 |
| 9,252,559 | B2 | 2/2016 | Narayanan et al. | |
| 10,855,372 | B1 * | 12/2020 | Puckett | G02B 6/02076 |
| 2003/0103541 | A1 * | 6/2003 | Zheng | H01S 5/10 372/92 |
| 2006/0056465 | A1 * | 3/2006 | Xie | H01S 3/10 372/20 |
| 2006/0088066 | A1 * | 4/2006 | He | H01S 5/0265 372/50.1 |
| 2006/0215713 | A1 * | 9/2006 | Flanders | H01S 5/141 372/98 |
| 2007/0008996 | A1 * | 1/2007 | Linville | H01S 3/08036 372/98 |
| 2010/0315642 | A1 * | 12/2010 | Chow | G01N 21/39 356/432 |
| 2014/0269807 | A1 * | 9/2014 | Matsui | H01S 5/06256 372/99 |
| 2015/0147020 | A1 * | 5/2015 | Kondo | H01S 5/141 385/10 |
| 2015/0288129 | A1 * | 10/2015 | Jain | H01S 3/094084 438/31 |
| 2017/0209959 | A1 * | 7/2017 | Popp | B23K 26/0626 |

FOREIGN PATENT DOCUMENTS

| | | | | |
|---|---|---|---|---|
| FR | 2562341 | A1 * | 10/1985 | |
| GB | 2369929 | A * | 6/2002 | H01S 5/18361 |
| GB | 2437593 | A * | 10/2007 | H01S 5/0265 |
| WO | WO-9952015 | A1 * | 10/1999 | B82Y 20/00 |
| WO | 2009070849 | A1 | 6/2009 | |

OTHER PUBLICATIONS

European Patent Office, "Communication pursuant to Article 94(3)", dated Mar. 13, 2024, from EP Application No. 21186531.6, from Foreign Counterpart to U.S. Appl. No. 17/376,894, pp. 1 through 8, Published: EP.

European Patent Office, "Communication pursuant to Article 94(3)EPC", dated Jul. 14, 2025, from EP Application No. 21186531.6, from Foreign Counterpart to U.S. Appl. No. 17/376,894, pp. 1 through 9, Published: EP.

* cited by examiner

SYSTEMS AND METHODS FOR REDUCTION OF OPTICAL SIGNAL LINEWIDTH

CROSS REFERENCE TO RELATED APPLICATIONS

This application claims the benefit of U.S. Provisional Patent Application Ser. No. 63/080,162 entitled "SYSTEMS AND METHODS FOR REDUCTION OF OPTICAL SIGNAL LINEWIDTH" filed on Sep. 18, 2020, which is incorporated herein by reference in its entirety.

U.S. GOVERNMENT LICENSE RIGHTS

This invention was made with Government support under Government Contract No. HR0011-16-C-0122 awarded by the Defense Advanced Research Projects Agency. The Government has certain rights in the invention.

BACKGROUND

Systems that use optical signals, like clocks and gyroscopes, operate more accurately when using narrow linewidth (or low phase noise) optical signals. Typically, systems produce narrow-linewidth optical signals by locking the optical signals to a passive high Q-factor (referred to herein, simply as "Q") resonator. Thus, increasing the Q of the resonator decreases the linewidth of the optical signals. Conventionally, Q is increased by increasing the length of a cavity of the resonator or increasing the cavity finesse.

SUMMARY

Systems and methods for reduction of optical signal linewidth are provided. In some embodiments, a system includes a laser that generates an optical signal. The system also includes a resonator configured to receive the optical signal. The resonator includes an optical resonator cavity comprising a first end and a second end, wherein the optical signal propagates in the optical resonator cavity at a resonant frequency. The resonator also includes a first optical anti-resonator terminating the first end and having a first stopband including the resonant frequency. Further, the resonator includes a second optical anti-resonator terminating the second end and having a second stopband including the resonant frequency. The system also includes a detector that generates an electrical signal from an output of the modified resonator. Moreover, the system includes Pound-Drever-Hall servo circuitry configured to generate control signals for controlling at least one of a frequency of the optical signal as generated by the laser and one or more phase modulation devices attached to at least one of the optical resonator cavity, the first optical anti-resonator, and the second optical anti-resonator, wherein each phase modulation device in the one or more phase modulation devices respectively changes a length of at least one of the optical resonator cavity, the first optical anti-resonator, and the second optical anti-resonator.

DRAWINGS

Embodiments of the present invention can be more easily understood and further advantages and uses thereof more readily apparent when considered in view of the description of the preferred embodiments and the following figures in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

The present disclosure describes systems and methods for the reduction of optical signal linewidth. As mentioned above, the optical signal linewidth depends on the Q of a resonator used for locking the optical signal. A higher Q is associated with a narrower linewidth. A resonator Q can be calculated as:

$$Q = 2\pi \left( \frac{\text{Energy Stored}}{\text{Energy Dissipated per Cycle}} \right)$$

As shown, increasing the energy stored within the resonator increases the resonator Q. Increasing the size of the resonator increases the amount of energy stored in the resonator. However, frequently resonators are used within systems subject to size constraints. Also, reducing the energy dissipated per cycle increases the resonator Q. Conventionally, a cavity is terminated at each end with a high reflectance mirror having a reflectance of about 99.999%. However, because the reflectance is not one hundred percent, optical signal energy leaks through each mirror and is dissipated each cycle.

As system size restraints limit the ability to increase the energy stored within a resonator, the present disclosure describes systems and methods for increasing the resonator Q by reducing the energy dissipated per cycle. For example, instead of terminating each end of the resonator with high reflectance mirrors, systems and methods described herein replace each mirror with an optical anti-resonator. As used herein, an optical anti-resonator refers to an optical resonator having resonance peaks that do not overlap with the frequency of an input optical signal ($f_0$). Thus, the transmission of the optical signal through the anti-resonator is reduced, and the optical resonator leaks less optical signal energy each cycle. As less optical energy is lost each cycle, the Q increases, and the linewidth decreases.

Figure 1A:
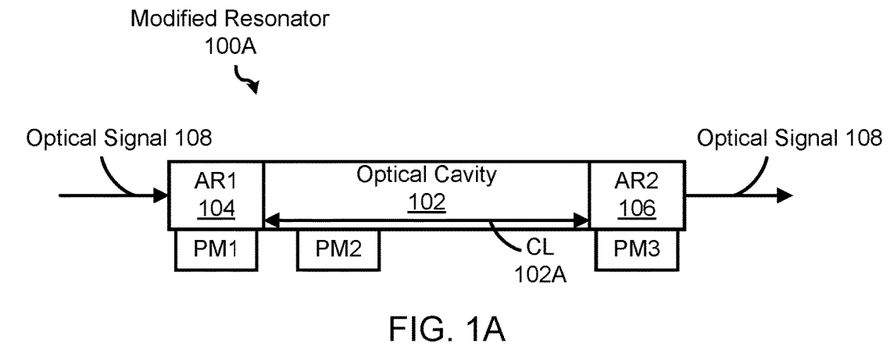
FIG. 1A illustrates a block diagram of one embodiment of a resonator comprising anti-resonators according to an aspect of the present disclosure.

FIG. 1A illustrates a block diagram of one embodiment of a modified resonator 100A that uses anti-resonators 104 and 106 to reduce the optical signal energy lost each cycle. As used herein, an optical resonator may refer to a device having an optical resonator cavity 102, where light propagates within the optical cavity with greater intensity at particular frequencies. The frequencies of light propagation within the resonator are known as resonant frequencies.

In some embodiments, the optical cavity 102 includes a first end and a second end, where light is reflected between the first end and second end of the optical resonator cavity 102. The distance between the first and second ends of the optical resonator cavity 102 may be known as the cavity length (CL) 102A of the optical resonator cavity 102. An optical signal 108, such as an input laser, may be coupled into the optical resonator cavity 102 at an input laser frequency $f_0$. The CL 102A of the optical resonator cavity 102 satisfies the resonance condition for the input laser frequency $f_0$. Thus, the optical signal 108 resonates within the optical resonator cavity 102. A portion of the resonating optical signal 108 is coupled out of the optical resonator cavity 102.

In certain embodiments, to reduce the amount of energy dissipated from the resonating optical signal 108 within the optical resonator cavity 102, the optical resonator cavity 102 is terminated with anti-resonators (AR). For example, a first anti-resonator (AR1) 104 terminates the first end of the optical resonator cavity 102, and a second anti-resonator (AR2) 106 terminates the second end of the optical resonator cavity 102. Each of the AR1 104 and the AR2 106 has a reflectance greater than 99.999% at $f_0$. Thus, more light is reflected by the AR1 104 and the AR2 106 than the amount of light reflected by high-reflectance mirrors. Thus, using the AR1 104 and the AR2 106 reduces the energy dissipation of the optical signal 108 per cycle, increasing the Q of the modified resonator 100A.

Each of the anti-resonators (AR1 104 and AR2 106) has a stopband. The resonant frequency of the optical resonator cavity 102 and the frequency of the input laser fall within the stopbands of the AR1 104 and the AR2 106. Dimensions of each of the AR1 104 and the AR2 106 determine the stopband of the corresponding anti-resonator. When an optical signal 108, at $f_0$, is incident upon an external surface of the AR1 104, the optical signal 108 propagates through the AR1 104, the optical resonator cavity 102, and the AR2 106 to an external surface of the AR2 106. A portion of the optical signal 108 resonates within the optical resonator cavity 102.

In some implementations, the components of the modified resonator 100A are subject to environmental disturbances. For example, the components of the modified resonator 100A may expand or contract because of changes in temperature or strain. The environmental disturbances may change the resonant frequency of the modified resonator 100A. In some implementations, systems may vary the resonant frequency of the modified resonator 100A. Accordingly, the modified resonator 100A may include at least one phase modulation device or circuit (PM) that controls the optical path lengths of the modified resonator 100A. For example, a phase modulation device may be coupled (e.g., attached) to each of the optical resonator cavity 102, the AR1 104, and the AR2 106. Optionally, each phase modulation device may be a piezoelectric device (or circuit) or other type of device that can provide an optical path length change.

In certain embodiments, the PM(s) can change the optical path lengths of the modified resonator 100A. For example, a first PM (PM1) may change the optical path length through the AR1 104, a second PM (PM2) may change a cavity length 102A of the optical resonator cavity 102, and a third PM (PM3) may change the optical path length through the AR2 106. The PM1, PM2, and PM3 may change the optical cavity lengths of the modified resonator 100A to affect a desired resonant frequency of the modified resonator 100A. An electrical control signal is configured to be electrically coupled to PM1, PM2, and PM3 to control such optical path lengths. For pedagogical purposes, FIG. 1A illustrates first PM(s) PM1, second PM(s) PM2, and third PM(s) PM3 mechanically coupled respectively to the first anti-resonator AR1, the resonator cavity 102, and the second anti-resonator AR2.

Figure 1B:
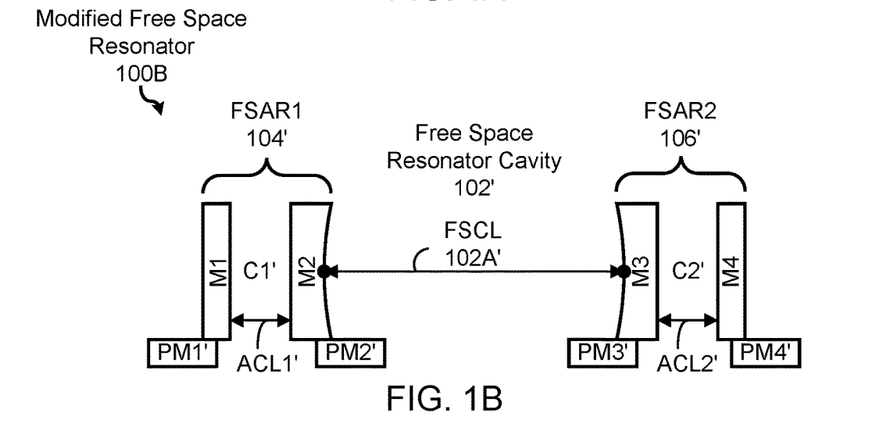
FIG. 1B illustrates a block diagram of one embodiment of a resonator comprising anti-resonators utilizing free-space optical components according to an aspect of the present disclosure.

The modified resonator 100A may be implemented using free-space optical components, optical fibers, and/or optical waveguide components. FIG. 1B illustrates a block diagram of one embodiment of a modified free-space resonator 100B. The modified free space resonator 100B includes anti-resonators that use free-space optical components. For example, the modified free space resonator 100B includes a first free-space anti-resonator (FSAR1) 104' and a second free-space anti-resonator (FSAR2) 106'.

The first free space anti-resonator FSAR1 104' comprises a first mirror M1 and a second mirror M2 separated by a first free space cavity C1'. Opposing surfaces of the first mirror M1 and the second mirror M2 are separated by a first free space distance (or length) ACL1', the length of the first free space cavity C1'. The second free space anti-resonator FSAR2 106' comprises a third mirror M3 and a fourth mirror M4 separated by a second free space cavity C2'. Opposing surfaces of the third mirror M3 and the fourth mirror M4 are separated by a second free space distance (or length) ACL2', the length of the second free space cavity C2'. Each of the first free space distance ACL1' and the second free space distance ACL2' equal $N/2\lambda+X$, where N is a non-zero integer and X must be substantially less than $\lambda/2$ and substantially greater than zero so that the resonant frequency of the free space cavity 102' is within the stopband of the FSAR1 104' and the FSAR2 106'. Accordingly, the optical signal 108 having a wavelength $\lambda$ is within the stopband of the FSAR1 104' and the FSAR2 106'. For example, X may equal $\lambda/4$. Optionally, the first free space distance ACL1' and the second free space distance ACL2' are equal.

The modified free-space resonator 100B comprises a free-space resonator optical cavity (or free-space resonator cavity) 102' formed between opposing surfaces of the second mirror M2 and the third mirror M3. The free-space cavity length (FSCL) 102A' of the free-space resonator cavity 102' corresponds to a resonant frequency of the modified free-space resonator 100B. The free space cavity length (FSCL 102A') of the free space resonator cavity 102' equals $M/2\lambda$, where M is a non-zero integer and $\lambda$ is a wavelength of input light (such as the wavelength of the optical signal 108). The length FSCL 102A' of the free space resonator cavity 102' is measured between the opposing surfaces of the second mirror M2 and the third mirror M3. Optionally, each opposing surface of the second mirror M2 and the third mirror M3 is concave to match a wavefront of an optical signal reflected by each opposing surface. Optionally, the first free space distance ACL1' and the second free space distance ACL2' are reduced to increase the free space cavity length FSCL 102A', which increases the amount of energy stored in the modified free space resonator 100B and increases the Q-factor of the modified free space resonator 100B.

Since the first free-space cavity C1', the second free space cavity C2', and the free space resonator cavity 102' are free-space cavities, their lengths can be adjusted by using piezoelectric devices (e.g., lead zirconate titanate or PZT) attached to the mirrors of the modified free space resonator 100B. At least one PZT can be mechanically coupled to each of the first mirror M1, the second mirror M2, the third mirror M3, and/or the fourth mirror M4. However, at least one PM can be mechanically coupled to one, two, or three of the mirrors of the modified free-space resonator 100B. For pedagogical purposes, FIG. 1B shows a first PM PM1', a second PM PM2', a third PM PM3', and a fourth PM PM4' respectively mechanically coupled to the first mirror M1, the second mirror M2, the third mirror M3, and the fourth mirror M4.

Figure 1C:
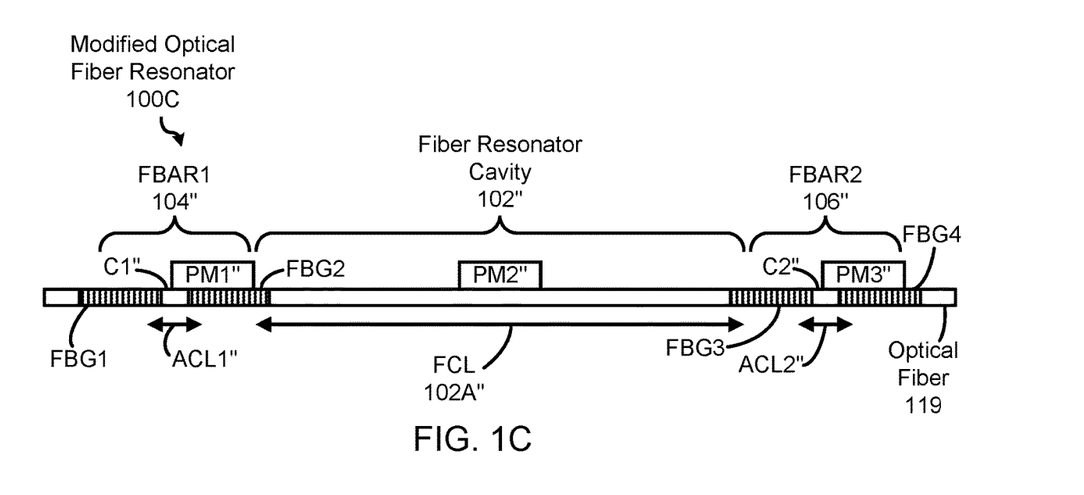
FIG. 1C illustrates a block diagram of one embodiment of a resonator comprising anti-resonators utilizing optical fiber according to an aspect of the present disclosure.

FIG. 1C illustrates a block diagram of one embodiment of a resonator comprising anti-resonators utilizing optical fiber (modified optical fiber resonator) 100C. The modified optical fiber resonator 100C comprises optical fiber 119. The modified optical fiber resonator 100C comprises a first optical fiber anti-resonator (FBAR1) 104" and a second optical fiber anti-resonator (FBAR2) 106" terminating opposite ends of a fiber resonator cavity 102". The fiber resonator cavity 102" is made from optical fiber 119.

FBAR1 104" comprises a first fiber Bragg grating FBG1, a first fiber cavity C1", and a second fiber Bragg grating FBG2. A first effective cavity length ACL1" of the first fiber cavity C1" is substantially equal to the above equation provided for the first and second free space distances ACL1', ACL2'. FBAR2 106" comprises a third fiber Bragg grating FBG3, a second fiber cavity C2", and a fourth fiber Bragg grating FBG4. A second effective cavity length ACL2" of the second fiber cavity C2" is substantially equal to the above equation provided for the first and second free space distances ACL1', ACL2'. Optionally, the first effective cavity length ACL1" and the second effective cavity length ACL2" are equal. The fiber Bragg grating is selected to match the center frequency of the optical signal. Optionally, the bandwidth of each fiber Bragg grating is less than 10 GHz to prevent the possible Stimulated Brillouin Scattering (SBS) generation in the cavity. Optionally, the first effective cavity length ACL1" and the second effective cavity length ACL2" are reduced to increase the fiber cavity length FCL 102A", which has the effect of increasing the Q-factor of the modified optical fiber resonator 100C. For example, the first effective cavity length ACL1" and the second effective cavity length ACL2" are reduced while maintaining the resonant frequency associated with the larger fiber cavity length FCL 102A" within the stopband of the FBAR1 104" and the FBAR2 106".

The modified optical fiber resonator 100C further comprises a fiber optical resonator cavity (or fiber resonator cavity) 102" formed by optical fiber 119 between fiber Bragg grating FBG2 and the third fiber Bragg grating FBG3. The effective length FCL 102A" of the fiber resonator cavity 102" corresponds to a resonant frequency of the modified resonator 100A. The effective cavity length (FCL 102A") of the fiber resonator cavity 102" is substantially equal to the above equation provided for FSCL 102A'.

Optionally, at least one PM can be coupled to each of the fiber resonator cavity 102", the first fiber cavity C1", and the second fiber cavity C2". For pedagogical purposes, FIG. 1C illustrates a first PM PM1", a second PM PM2", and a third PM PM3" respectively coupled to the first fiber cavity C1", the optical fiber 119 comprising the optical fiber resonator cavity 102", and the second fiber cavity C2".

Figure 2:
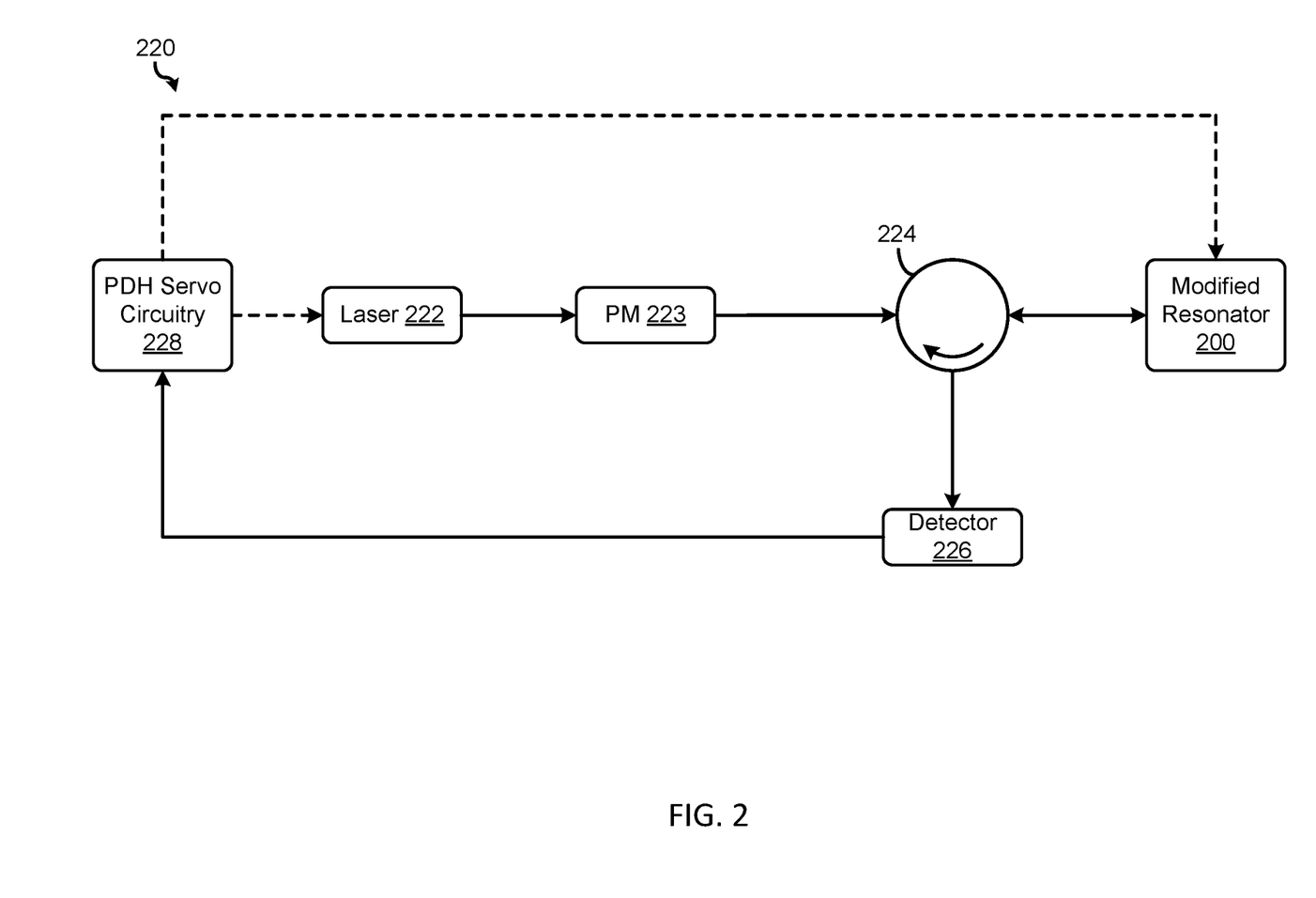
FIG. 2 illustrates a block diagram of one embodiment of a system for reducing optical linewidth using a modified resonator according to an aspect of the present disclosure.

FIG. 2 illustrates a block diagram of one embodiment of a system 220 for reducing optical linewidth using a modified resonator 200. The system 220 comprises a laser 222, an optical circulator (circulator) 224, the modified resonator 200, a detector (or detector circuit) 226, and Pound Drever Hall (PDH) servo circuitry 228.

The laser 222 is configured to generate an optical signal. The output of the laser 222 is optically coupled to an input of a phase modulator (PM) 223. The phase modulator 223 is configured to frequency modulate (at a PDH frequency) the optical signal emitted by the laser 222 to permit locking of the PDH servo circuitry 228. The PDH frequency is larger than the cavity linewidth of the modified resonator 200.

The optical circulator 224 comprises three ports. A first port of the optical circulator 224 is optically coupled to the output of the phase modulator 223 and receives the frequency modulated optical signal produced by the phase modulator 223. Optically coupled means that two components are coupled to transmit an optical signal between each component. A second port of the optical circulator 224 is optically coupled to an input port of the modified resonator 200 and provides the optical signal to the input port of the modified resonator 200.

Some of the input light that doesn't overlap with the cavity resonances of the modified resonator 200 is reflected from the input port of the modified resonator 200, through the second port of the optical circulator 224, and transmitted from a third port of the optical circulator 224. The detector 226 is optically coupled to the third port of the optical circulator 224 and is configured to receive (at an input of the detector 226) the reflected optical signal and generate (at an output of the detector 226) an electrical signal proportional to the incident power level of the reflected optical signal. Optionally, the detector 226 is a photodiode or photodetector.

The PDH servo circuitry 228 comprises an input coupled to the output of the detector 226 and is configured to receive the electrical signal produced by the detector 226. The PDH servo circuitry 228 has an output coupled to either an input of the laser 222 or a control port of the modified resonator 200. When the output of the PDH servo circuitry 228 is coupled to the input of the laser 222, the PDH servo circuitry 228 generates an electrical control signal at the output of the PDH servo circuitry 228 that tunes the center frequency of the optical signal generated by the laser 222 to equal the resonant frequency of the modified resonator 200. Alternatively, when the output of the PDH servo circuitry 228 is coupled to the control port of the modified resonator 200, the PDH servo circuitry 228 generates an electrical control signal at the output of the PDH servo circuitry 228 that tunes the resonant frequency of the modified resonator 200 to equal the center frequency of the optical signal generated by the laser 222. The control port of the modified resonator 200 may be coupled to one or more PMs of the modified resonator 200. The electrical control signal can affect the PM(s) to modify or tune the resonant frequency of the modified resonator 200. Once the center frequency of the optical signal generated by the laser 222 equals the resonant frequency of the modified resonator 200, the input optical signal from the optical circulator 224 passes through the input of the modified optical resonator 200 and is emitted at the output of the modified resonator 200. While the low-frequency phase noise of the input beam is stabilized through a PDH loop, the phase noise at offset frequencies higher than the cavity linewidth is filtered out by the modified resonator 200.

Another benefit of the modified resonator 200 is its short cavity length and larger free spectral range (FSR). Thus, the bandwidth of the feedback loop, including the PDH servo circuitry 228, is larger. As a result, the center frequency of the optical signal and the resonant frequency of the modified resonator 200 more accurately track one another.

Figure 3:
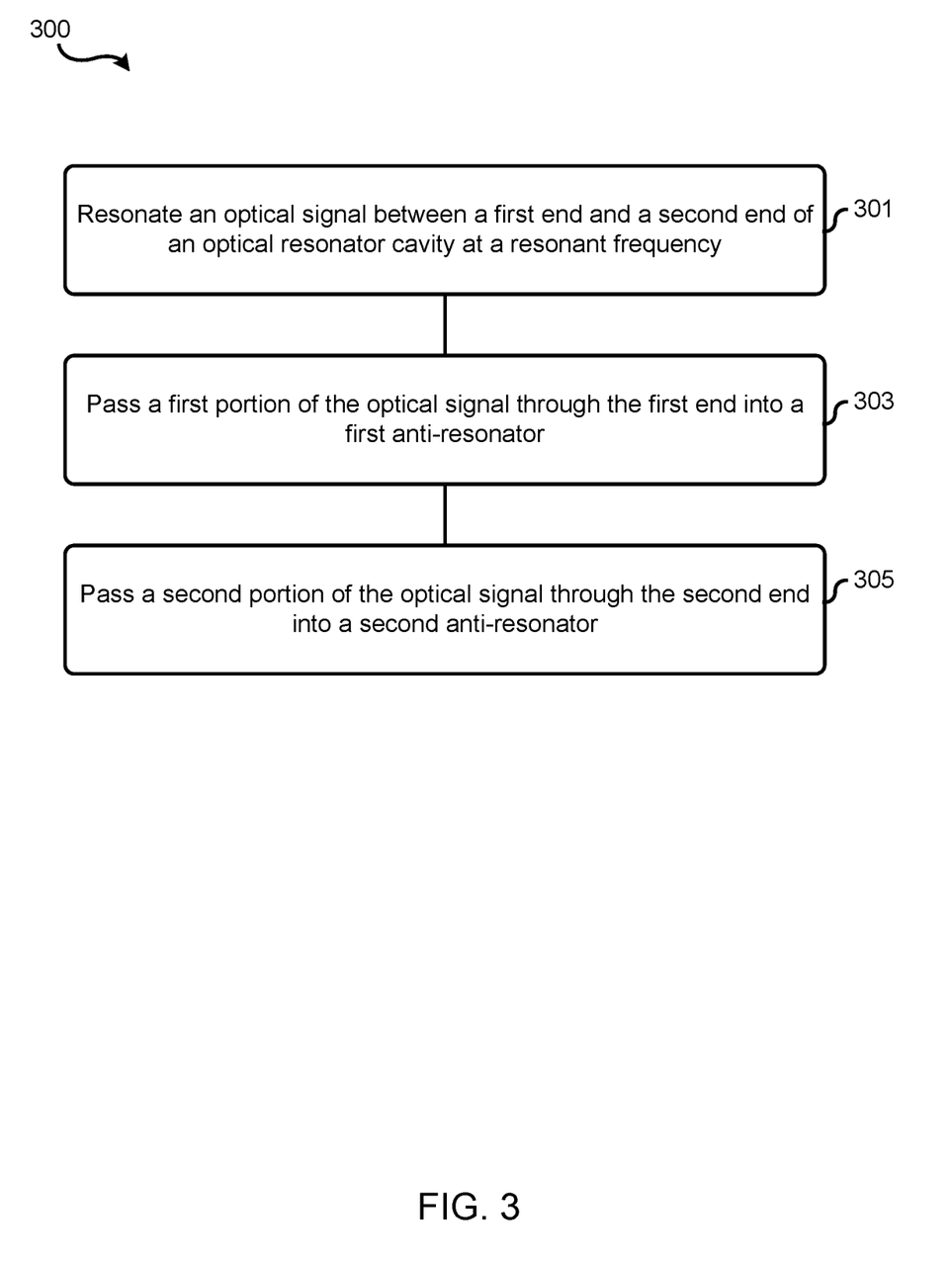
FIG. 3 illustrates a flowchart diagram of a method for reducing optical linewidth using a modified resonator according to an aspect of the present disclosure.

FIG. 3. is a flowchart diagram of a method 300 for reducing the optical signal linewidth. The method 300 proceeds at 301, where an optical signal is resonated between a first end and a second end of an optical resonator cavity at a resonant frequency. Additionally, the method 300 proceeds at 303, where a first portion of the optical signal is passed through the first end into a first anti-resonator. Moreover, the method 300 proceeds at 305, where a second portion of the optical signal is passed through the second end into a second anti-resonator. Further, both of the anti-resonators have stopbands that include the resonant frequency of the optical resonator cavity. The anti-resonators increase the Q of the optical resonator as described above.

Terms of relative position used in this application are defined based on a plane parallel to, or in the case of the term coplanar—the same plane as, the conventional plane or working surface of a device, layer, wafer, or substrate, regardless of orientation. The term "horizontal" or "lateral" as used in this application are defined as a plane parallel to the conventional plane or working surface of a device, layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a device, layer, wafer, or substrate, regardless of orientation. The term "coplanar" used in this application is defined as a plane in the same plane as the conventional plane or working surface of a device, layer, wafer, or substrate, regardless of orientation.

Several examples defined by the following claims have been described. Nevertheless, it will be understood that various modifications to the described examples may be made without departing from the spirit and scope of the claimed invention. Therefore, it is manifestly intended that this invention be limited only by the claims and the equivalents thereof.

In various alternative embodiments, system elements, method steps, or examples described throughout this disclosure (such as the PDH servo circuitry 228 or sub-parts thereof, for example) may be implemented on one or more computer systems, field programmable gate array (FPGA), or similar devices comprising a processor executing code to realize those elements, processes, or examples, said code stored on a non-transient data storage device. Therefore, other embodiments of the present disclosure may include elements comprising program instructions resident on computer-readable media which, when implemented by such computer systems, enable them to implement the embodiments described herein. As used herein, the term "computer-readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High Speed Integrated Circuit (VHSIC) Hardware Description Language (VHDL).

EXAMPLE EMBODIMENTS

Example Embodiments

Example 1 includes a resonator having narrow linewidth resonant frequency peaks, comprising: an optical resonator cavity comprising a first end and a second end, wherein an optical signal propagates in the optical resonator cavity at a resonant frequency; a first anti-resonator terminating the first end and having a first stopband including the resonant frequency; and a second anti-resonator terminating the second end and having a second stopband including the resonant frequency.

Example 2 includes the resonator of Example 1, wherein each of the first anti-resonator and the second anti-resonator comprises a first mirror and a second mirror, wherein the first mirror is located at one of the first end or the second end of the optical resonator cavity and the second mirror is located at a free space distance from the first mirror, where the free space distance is equal to a multiple of half of a wavelength of the optical signal plus a fraction of the wavelength, wherein the fraction of the wavelength is substantially less than half of the wavelength and substantially greater than zero.

Example 3 includes the resonator of any of Examples 1-2, wherein each of the first anti-resonator and the second anti-resonator comprises a first fiber Bragg grating and a second fiber Bragg grating, wherein the first fiber Bragg grating is located at one of the first end or the second end of the optical resonator cavity and the second fiber Bragg grating is located at an effective cavity length from the first fiber Bragg grating, where the effective cavity length is equal to a multiple of half of a wavelength of the optical signal plus a fraction of the wavelength, wherein the fraction of the wavelength is substantially less than half of the wavelength and substantially greater than zero.

Example 4 includes the resonator of Example 3, wherein the optical resonator cavity comprises optical fiber.

Example 5 includes the resonator of any of Examples 3-4, wherein a bandwidth of the first fiber Bragg grating and the second fiber Bragg grating is less than 10 GHz.

Example 6 includes the resonator of any of Examples 1-5, further comprising one or more phase modulation devices attached to at least one of the optical resonator cavity, the first anti-resonator, and the second anti-resonator, wherein each phase modulation device in the one or more phase modulation devices respectively changes a length of at least one of the optical resonator cavity, the first anti-resonator, and the second anti-resonator.

Example 7 includes the resonator of Example 6, wherein the one or more phase modulation devices are piezoelectric devices.

Example 8 includes the resonator of any of Examples 1-7, wherein the optical resonator cavity, the first optical anti-resonator, and the second optical anti-resonator are optical waveguides.

Example 9 includes the resonator of any of Examples 1-8, wherein a first anti-resonator cavity length of the first optical anti-resonator is equal to a second anti-resonator cavity length of the second optical anti-resonator.

Example 10 includes a method comprising: resonating an optical signal between a first end and a second end of an optical resonator cavity at a resonant frequency; passing a first portion of the optical signal through the first end into a first anti-resonator; and passing a second portion of the optical signal through the second end into a second anti-resonator, wherein the resonant frequency is within a stopband of the first anti-resonator and the second anti-resonator.

Example 11 includes the method of Example 10, wherein each of the first anti-resonator and the second anti-resonator comprises a first mirror and a second mirror, wherein the first mirror is located at one of the first end or the second end of the optical resonator cavity and the second mirror is located at a free space distance from the first mirror, where the free space distance is equal to a multiple of half of a wavelength of the optical signal plus a fraction of the wavelength, wherein the fraction of the wavelength is substantially less than half of the wavelength and substantially greater than zero.

Example 12 includes the method of Example 11, wherein the fraction of the wavelength is equal to a quarter of the wavelength.

Example 13 includes the method of any of Examples 10-12, wherein the optical resonator cavity comprises optical fiber and each of the first anti-resonator and the second anti-resonator comprises a first fiber Bragg grating and a second fiber Bragg grating formed in the optical fiber, wherein the first fiber Bragg grating is located at one of the first end or the second end of the optical resonator cavity and the second fiber Bragg grating is located at an effective cavity length from the first fiber Bragg grating, where the effective cavity length is equal to a multiple of half of a wavelength of the optical signal plus a fraction of the wavelength, wherein the fraction of the wavelength is substantially less than half of the wavelength and substantially greater than zero.

Example 14 includes the method of Example 13, wherein a bandwidth of the first fiber Bragg grating and the second fiber Bragg grating is less than 10 GHz.

Example 15 includes the method of any of Examples 10-14, further comprising one or more phase modulation devices attached to at least one of the optical resonator cavity, the first anti-resonator, and the second anti-resonator, wherein each phase modulation device in the one or more phase modulation devices respectively changes a length of at least one of the optical resonator cavity, the first anti-resonator, and the second anti-resonator.

Example 16 includes the method of Example 15, wherein the one or more phase modulation devices are piezoelectric devices.

Example 17 includes the method of any of Examples 15-16, further comprising reducing the length of the first anti-resonator and the second anti-resonator to increase the length of the optical resonator cavity while maintaining the resonant frequency of the optical resonator cavity within the stopband of the first anti-resonator and the second anti-resonator.

Example 18 includes the method of any of Examples 10-17, wherein the optical resonator cavity, the first anti-resonator, and the second anti-resonator are optical waveguides.

Example 19 includes the method of any of Examples 10-18, wherein a first anti-resonator cavity length of the first anti-resonator is equal to a second anti-resonator cavity length of the second anti-resonator.

Example 20 includes a system comprising: a laser that generates an optical signal; a resonator configured to receive the optical signal, wherein the resonator comprises: an optical resonator cavity comprising a first end and a second end, wherein the optical signal propagates in the optical resonator cavity at a resonant frequency; a first optical anti-resonator terminating the first end and having a first stopband including the resonant frequency; and a second optical anti-resonator terminating the second end and having a second stopband including the resonant frequency; a detector that generates an electrical signal from an output of the modified resonator; and Pound-Drever-Hall servo circuitry configured to generate control signals for controlling at least one of a frequency of the optical signal as generated by the laser and one or more phase modulation devices attached to at least one of the optical resonator cavity, the first optical anti-resonator, and the second optical anti-resonator, wherein each phase modulation device in the one or more phase modulation devices respectively changes a length of at least one of the optical resonator cavity, the first optical anti-resonator, and the second optical anti-resonator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A resonator having narrow linewidth resonant frequency peaks, comprising:
   an optical resonator cavity comprising a first end and a second end, wherein an optical signal propagates in the optical resonator cavity at a resonant frequency;
   a first anti-resonator terminating the first end and having a first stopband including the resonant frequency; and
   a second anti-resonator terminating the second end and having a second stopband including the resonant frequency;
   a first phase modulation device attached to the optical resonator cavity configured to change a length of the optical resonator cavity;
   a second phase modulation device attached to the first anti-resonator configured to change a length of the first anti-resonator; and
   a third phase modulator device attached to the second anti-resonator configured to change a length of the second anti-resonator.

2. The resonator of claim 1, wherein each of the first anti-resonator and the second anti-resonator comprises a first mirror and a second mirror, wherein the first mirror is located at one of the first end or the second end of the optical resonator cavity and the second mirror is located at a free space distance from the first mirror, where the free space distance is equal to a multiple of half of a wavelength of the optical signal plus a fraction of the wavelength, wherein the fraction of the wavelength is substantially less than half of the wavelength and substantially greater than zero.

3. The resonator of claim 1, wherein each of the first anti-resonator and the second anti-resonator comprises a first fiber Bragg grating and a second fiber Bragg grating, wherein the first fiber Bragg grating is located at one of the first end or the second end of the optical resonator cavity and the second fiber Bragg grating is located at an effective cavity length from the first fiber Bragg grating, where the effective cavity length is equal to a multiple of half of a wavelength of the optical signal plus a fraction of the wavelength, wherein the fraction of the wavelength is substantially less than half of the wavelength and substantially greater than zero.

4. The resonator of claim 3, wherein the optical resonator cavity comprises optical fiber.

5. The resonator of claim 3, wherein a bandwidth of the first fiber Bragg grating and the second fiber Bragg grating is less than 10 GHz.

6. The resonator of claim 1, wherein the one or more of the first, second, or third phase modulation devices are piezoelectric devices.

7. The resonator of claim 1, wherein the optical resonator cavity, the first optical anti-resonator, and the second optical anti-resonator are optical waveguides.

8. The resonator of claim 1, wherein a first anti-resonator cavity length of the first optical anti-resonator is equal to a second anti-resonator cavity length of the second optical anti-resonator.

9. A method comprising: resonating an optical signal between a first end and a second end of an optical resonator cavity at a resonant frequency; passing a first portion of the optical signal through the first end into a first anti-resonator; and passing a second portion of the optical signal through the second end into a second anti-resonator, wherein the resonant frequency is within a stopband of the first anti-resonator and the second anti-resonator; wherein one or more phase modulation devices are attached to at least one of the optical resonator cavity, the first anti-resonator, and the second anti-resonator, wherein each phase modulation device in the one or more phase modulation devices respectively changes a length of at least one of the optical resonator cavity, the first anti-resonator, and the second anti-resonator; and reducing the length of the first anti-resonator and the second anti-resonator to increase the length of the optical resonator cavity while maintaining the resonant frequency of the optical resonator cavity within the stopband of the first anti-resonator and the second anti-resonator.

10. The method of claim 9, wherein each of the first anti-resonator and the second anti-resonator comprises a first mirror and a second mirror, wherein the first mirror is located at one of the first end or the second end of the optical resonator cavity and the second mirror is located at a free space distance from the first mirror, where the free space distance is equal to a multiple of half of a wavelength of the optical signal plus a fraction of the wavelength, wherein the fraction of the wavelength is substantially less than half of the wavelength and substantially greater than zero.

11. The method of claim 10, wherein the fraction of the wavelength is equal to a quarter of the wavelength.

12. The method of claim 9, wherein the optical resonator cavity comprises optical fiber and each of the first anti-resonator and the second anti-resonator comprises a first fiber Bragg grating and a second fiber Bragg grating formed in the optical fiber, wherein the first fiber Bragg grating is located at one of the first end or the second end of the optical resonator cavity and the second fiber Bragg grating is located at an effective cavity length from the first fiber Bragg grating, where the effective cavity length is equal to a multiple of half of a wavelength of the optical signal plus a fraction of the wavelength, wherein the fraction of the wavelength is substantially less than half of the wavelength and substantially greater than zero.

13. The method of claim 12, wherein a bandwidth of the first fiber Bragg grating and the second fiber Bragg grating is less than 10 GHz.

14. The method of claim 9, wherein the one or more phase modulation devices are piezoelectric devices.

15. The method of claim 9, wherein the optical resonator cavity, the first anti-resonator, and the second anti-resonator are optical waveguides.

16. The method of claim 9, wherein a first anti-resonator cavity length of the first anti-resonator is equal to a second anti-resonator cavity length of the second anti-resonator.

17. A system comprising:
a laser that generates an optical signal;
a resonator configured to receive the optical signal, wherein the resonator comprises:
an optical resonator cavity comprising a first end and a second end, wherein the optical signal propagates in the optical resonator cavity at a resonant frequency;
a first optical anti-resonator terminating the first end and having a first stopband including the resonant frequency; and
a second optical anti-resonator terminating the second end and having a second stopband including the resonant frequency;
a detector that generates an electrical signal from an output of the modified resonator; and
Pound-Drever-Hall servo circuitry configured to generate control signals for controlling at least one of a frequency of the optical signal as generated by the laser and one or more phase modulation devices attached to at least one of the optical resonator cavity, the first optical anti-resonator, and the second optical anti-resonator, wherein each phase modulation device in the one or more phase modulation devices respectively changes a length of at least one of the optical resonator cavity, the first optical anti-resonator, and the second optical anti-resonator.

* * * * *